United States Patent
Whitaker

(10) Patent No.: US 9,255,372 B2
(45) Date of Patent: Feb. 9, 2016

(54) HALF-BARREL INTAKE SCREEN

(71) Applicant: Hendrick Screen Company, Owensboro, KY (US)

(72) Inventor: John Whitaker, Owensboro, KY (US)

(73) Assignee: HENDRICK SCREEN COMPANY, Owensboro, KY (US)

( * ) Notice: Subject to any disclaimer, the term of this patent is extended or adjusted under 35 U.S.C. 154(b) by 283 days.

(21) Appl. No.: 13/925,976

(22) Filed: Jun. 25, 2013

(65) Prior Publication Data

US 2014/0374340 A1 Dec. 25, 2014

(51) Int. Cl.
E02B 5/08 (2006.01)
B01D 29/33 (2006.01)
B01D 35/02 (2006.01)

(52) U.S. Cl.
CPC ............ E02B 5/085 (2013.01); B01D 29/33 (2013.01); B01D 35/02 (2013.01); C02F 2303/24 (2013.01)

(58) Field of Classification Search
None
See application file for complete search history.

(56) References Cited

U.S. PATENT DOCUMENTS

| | | |
|---|---|---|
| 704,012 A | 7/1902 | Emerson |
| 969,364 A | 9/1910 | Grootenhuis |
| 1,348,945 A | 8/1920 | Hirshstein |
| 1,579,917 A | 4/1926 | Deming |
| 1,810,981 A | 6/1931 | Noble |
| 2,022,336 A | 11/1935 | Bower |
| 2,136,853 A | 11/1938 | Knecht |
| 4,017,394 A | 4/1977 | Hensley |
| 4,245,924 A * | 1/1981 | Fouss ............ B29C 65/02 138/119 |
| 5,102,537 A | 4/1992 | Jones |
| 5,156,738 A | 10/1992 | Maxson |
| 5,618,426 A * | 4/1997 | Eischen et al. ............ 210/541 |
| 5,653,874 A | 8/1997 | Berry, III |
| 5,851,087 A | 12/1998 | Berry, III |
| 6,051,131 A | 4/2000 | Maxson |
| 6,089,790 A | 7/2000 | Berry, III et al. |
| 6,126,016 A | 10/2000 | Graham |
| 6,508,933 B2 | 1/2003 | Wilkins et al. |
| 6,682,651 B1 | 1/2004 | Toland et al. |
| 6,712,959 B2 | 3/2004 | Ekholm et al. |
| 7,201,842 B2 | 4/2007 | Kiefer |
| 7,575,677 B1 | 8/2009 | Barnes |
| 8,192,622 B2 | 6/2012 | Kozey |
| 8,297,448 B2 | 10/2012 | Watson |
| 2003/0029780 A1 | 2/2003 | Ekholm et al. |
| 2011/0233132 A1* | 9/2011 | Wietharn ............ 210/403 |
| 2011/0240543 A1 | 10/2011 | Kozey |

FOREIGN PATENT DOCUMENTS

CA 2371051 A1 11/2000

OTHER PUBLICATIONS

Hendrick Screen, Owensboro, KY, Picture of Half Intake Screen, for installation at Hollister, CA, 1985.

(Continued)

Primary Examiner — Benjamin Kurtz
(74) Attorney, Agent, or Firm — Thomas E. Lees, LLC

(57) ABSTRACT

A half-barrel intake screen is disclosed. The half-barrel intake screen comprises a frame including a first end, a second end, and a bottom coupled between the first end and the second end. Further, a contiguous screen segment couples between the first end and the second end of the frame. However, the screen segment couples to the frame independently of a concrete body having an outlet. In other words, the intake screen does not include a concrete body having an outlet.

18 Claims, 5 Drawing Sheets

(56) References Cited

OTHER PUBLICATIONS

Hendrick Screen, Owensboro, KY, Schematic C-1051, for installation at Hollister, CA, revisions dated Oct. 24, 1985.
ISI, Intake Screens, Inc., "Brushed Cone for Shallow Intakes", Sacramento, CA, retrieved from <http://intakescreensinc.com/brushed-cone/> Jul. 31, 2012.
ISI, Intake Screens, Inc., "ISI Cone Screen for Shallow Problematic Intakes", brochure, retrieved from <http://intakescreensinc.com/storage/ISIBrushedConeScreen.pdf> on Jul. 31, 2012.
Johnson Screens; "Half Intake Screen System: A Solution for Shallow Water Intakes", brochure; 2011.
Photograph of Cook half intake screen for Franklin Water Treatment Plant installed 2007.
Photograph 2 of Cook half intake screen for Franklin Water Treatment Plant installed 2007.
Photograph 3 of Cook half intake screen for Franklin Water Treatment Plant installed 2007.
Cook Legacy Inc.; drawing of Franklin Water Treatment Plant Intake Screen Assembly; dated Jun. 2007.
Town of Franklin; half intake screen, Macon County, North Carolina; dated Jan. 2005.
Hendrick Screen, Owensboro, KY; drawings of screens offered for sale, CH2MHILL; dated Mar. 2003.
Hendrick Screen, Owensboro, KY; drawing of screen offered for sale, Hendersonville Intake Project; dated Feb. 26, 1998.
Hendrick Screen, Owensboro, KY; drawings of screens for installation at Hollister, CA; revisions dated Nov. 7, 1985.
Hendrick Screen Company, Owensboro, KY; drawings of intake domes for Shook Construction; dated 2011.
Hendrick Screen, Owensboro, KY; drawings of screens sold, Southern Sales Company, Inc.; dated 2010.

* cited by examiner

HALF-BARREL INTAKE SCREEN

BACKGROUND

Various aspects of the present invention relate generally to water diversion and specifically to water intake screens used in water diversion.

Water is required for many aspects of business and everyday life, and most of our water comes from natural resources (e.g., lakes, rivers, streams). For example, a water company may divert water from a lake or stream through a channel or system of channels to a treatment facility. Also, farmers may divert water for irrigating crops.

Water diversion techniques are divided into two general types: gravity and pumped. In gravity water diversion, the water is diverted into a channel or pipe leading off of the water source, and the flow is controlled by gravity. However, in pumped water diversion, the water is diverted into a pipe, and a mechanical pump removes the water from the source.

To help ensure that no debris, fish, or the like gets into the pipe or channel, a water intake screen is placed over an inlet to the pipe or channel. Most water intake screens include a hollow, central body with an outlet that couples to the channel used to take the water to the water treatment plant. Screened areas on both sides of the body allow water to enter while blocking out debris and fish. Thus, most water intake screens resemble a large cylinder including two screened sections and an outlet that mounts to the channel.

BRIEF SUMMARY

According to aspects of the present disclosure, a half-barrel intake screen is disclosed. The half-barrel intake screen comprises a frame including a first end, a second end, and a bottom coupled between the first end and the second end. Further, a contiguous screen segment couples between the first end and the second end of the frame. However, the screen segment couples to the frame independently of a concrete body having an outlet. In other words, the intake screen does not include a concrete body having an outlet.

According to further aspects of the present disclosure, the half-barrel intake screen described above attaches to a base. The base may be a vaulted base or a standard base.

BRIEF DESCRIPTION OF THE SEVERAL VIEWS OF THE DRAWINGS

In the Figures, like elements are referenced with like reference numbers.

DETAILED DESCRIPTION

According to aspects of the present disclosure, a water intake screen is provided and is suitable to divert debris, fish, etc. from entering channels and pipes associated with water diversion. The water intake screen may be used in gravity or pumped water diversion systems and may be active (including a debris removal system) or passive (lacking a debris removal system). As will be described in greater detail herein, the water intake screen is a half-barrel intake screen that includes a contiguous screened area coupled between two ends of the intake screen. Because the screened area is contiguous, the intake screen does not include a hollow body with an outlet. Instead, the water flows into the intake screen and out of the bottom of the intake screen.

Figure 1:
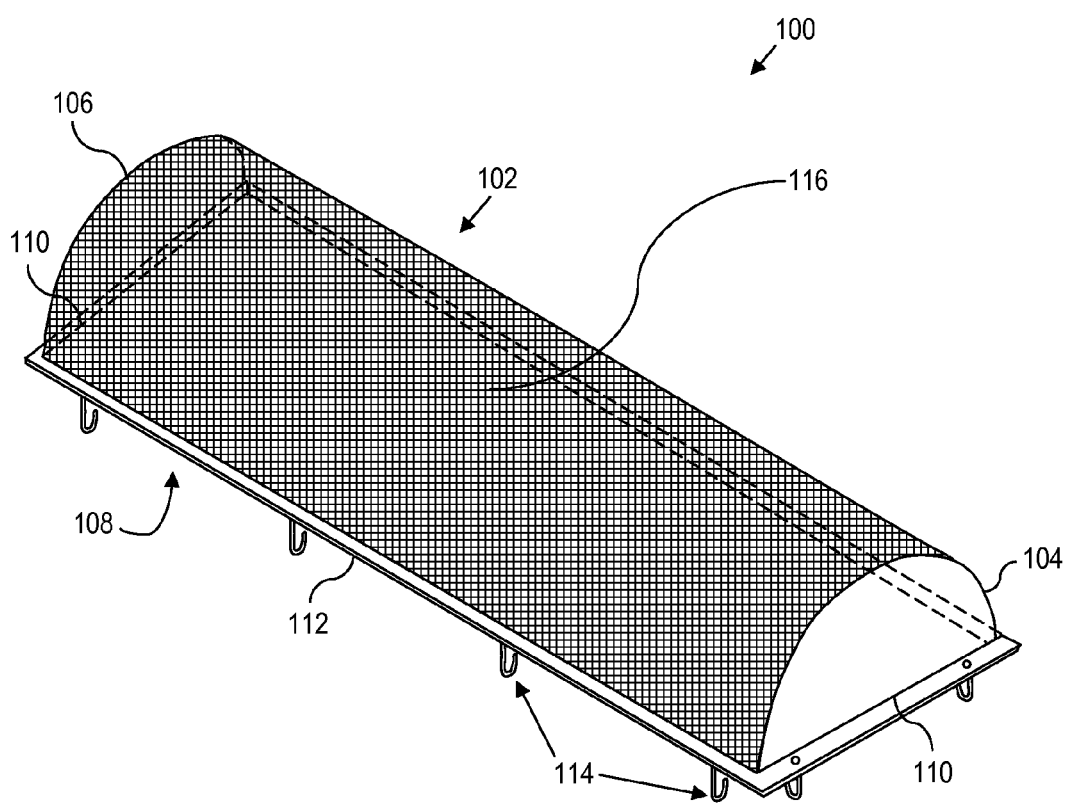
FIG. 1 is a diagram illustrating a half-barrel intake screen according to various aspects of the present disclosure.

Turning now to the figures and in particular FIG. 1, a half-barrel water intake screen 100 is shown. The half-barrel intake screen includes a frame 102 comprising a first end 104, a second end 106, and a bottom 108. The first and second ends 104, 106 can be any desired shape that includes at least one generally flat side 110.

For example, the first and second ends 104, 106 may be partially circular (e.g., a quarter of a circle, a semicircle, three-quarters of a circle, or otherwise any amount less than a full circle, a simple or complex rounded or otherwise curved section in general (e.g., partial ellipse, partial oval, etc.), etc.). Other examples include a triangle, a rectangle, an amorphous shape with at least one generally flat side, etc. Further, the first end 104 may be identical to the second end 106. Alternatively, the first end 104 may be different from the second end 106, (e.g., larger, smaller, a different shape, etc.).

Moreover, the first end 104, the second end 106, or both may be solid (as shown in FIG. 1). Alternatively, the first end 104, the second end 106, or both may include one or more features, such as a screen, a port, etc. Still further, the first end 104, the second end 106, or both may be three dimensional (e.g., concave, convex, pointed, conical, etc.).

As shown, the first end 104 and the second end 106 are perpendicular to the bottom 108; however there is no such requirement. In other words, the first end 104 and the second end 106 are not required to be perpendicular to the bottom 108 or parallel to each other 104, 106.

The bottom 108 of the frame 102 is coupled between the first end 104 and the second end 106 and creates a length for the intake screen 100. Further, the bottom 108 of the frame 102 includes a flange 112 running along the perimeter, so the intake screen 100 can be mounted to a base, as described in greater detail below. The flange 112 includes fasteners 114 that couple the intake screen 100 to the base. As illustrated, the fasteners 114 are hooks that may be embedded into the base or may hook onto loops embedded into the base. However, other types of fasteners 114 may be utilized (e.g., bolts, spikes, etc.). Moreover, the bottom 108 of the frame 102 includes an aperture configured such that water entering the intake screen 100 leaves through the aperture. The aperture may be any desired size, depending on a desired flow rate, a type of base utilized, and other devices present in the intake screen 100. For example, the aperture may be the entire space between the outline of the flange 112.

A contiguous screen segment 116 couples between the first end 104 and the second end 106 of the frame 108. In other words, as shown, there is one screen segment 116 running the length of the intake screen 100. Moreover, as will be described in greater detail herein, the contiguous screen segment 116 is coupled to the frame 102 independently of a body (e.g., a concrete body) having an outlet. In an illustrative implementation, the screen segment 116 defines a contiguous screen segment that couples directly to the first end 104, the second end 106, and the bottom 108 and runs the entire length of the intake screen 100. In an alternative implementation, the contiguous screen segment 116 can indirectly couple to the first end 104, the second end 106, and the bottom 108 (e.g., through a framing, bracketing, other suitable structures, etc.).

The screen segment 116 may follow the shape of one or both of the first end 104 and the second end 106 to make a three dimensional shape associated with the two dimensional shape of the first end 104 and the second end 106 (i.e., a prism). For example, if both of the first end 104 and the second end 106 are partially circular (as shown in FIG. 1), then the screen segment 116 can uniformly run between the two ends, creating a partially circular prism. In other words, the screen segment 116 may include a uniform cross section along the length of the intake screen between the first end 104 and the second end 106. As another example, if the first end 104 and the second end 106 are each triangular, then the screen segment 116 can make a triangular prism.

Alternatively, the contiguous screen segment 116 can make non-uniform shapes. For example, the intake screen 100 can have one partially circular end and a rectangular end, and the screen segment 116 creates a shape that starts as a partially circular prism and gradually morphs into a rectangular prism along the length of the screen. As another example, the first end 104 and the second end 106 may be congruent (e.g., defined by a partially circular shape), but the screen segment 116 gradually increases or decreases (or both at different points) in radius along the length. As such, while the illustrated embodiment of the half-barrel intake screen 100 is a uniform partially circular prism, other shapes that include at least one flat edge on the first end 104 and the second end 106 are within the scope of the present disclosure.

The screen segment 116 may be made of any suitable material such as wedge wire, profile bar, etc., which can be of any suitable metal, e.g., stainless steel, a copper-nickel alloy, etc.

The intake screens 100 described herein have been described as three dimensional shapes. However, as will be understood, the screen segment 116 couples to the frame 102 to make a generally hollow three dimensional shape with a generally open bottom 108. Thus, a fluid passes through the screen segment 116 to the hollow section of the intake screen 100 and out of the bottom 108.

Figure 2:
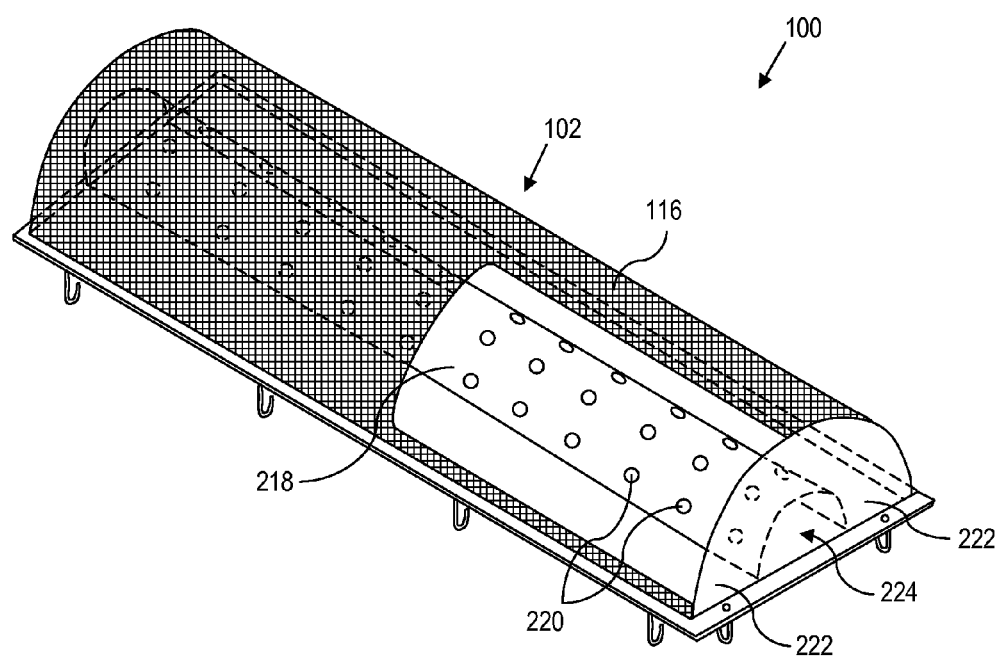
FIG. 2 is a diagram illustrating a half-barrel intake screen with a half-barrel flow modifier, according to various aspects of the present disclosure.

Turning now to FIG. 2, a half-barrel intake screen 100 with a flow modifier 218 is illustrated. The intake screen 100 includes a frame 102 and a contiguous screen segment 116. To show the flow modifier 218, a section of the screen segment 116 has been cut away. The flow modifier 218 is provided to ensure a desired flow of water over the length of the intake screen 100. In general, the flow modifier 218 is disposed on the bottom 108 of the frame 102 and runs the length of the frame 102.

The flow modifier 218 of FIG. 2 is a partially circular prism that runs the entire length of the screen segment 116. Moreover, the flow modifier 218 is concentric with the partially circular prism shape of the screen segment 116, and includes holes 220 which allow a fluid to flow from outside the flow modifier 218 to inside the flow modifier 218. The fluid passing through the holes 220 exits the bottom 108 of the intake screen 100.

To ensure the flow modifier 218 works properly, the bottom 108 of the frame 102 may be open only on the inside of the flow modifier 218 and closed on the outside of the flow modifier 218. That is, the bottom 108 may include solid panels 222 that flank an opening 224 defined by the interior of the flow modifier 218. Thus, all of the fluid that exits the bottom 108 of the screen (e.g., to go to a water treatment plant) must pass through the flow modifier 218. However, in an alternative implementation, the flow modifier 218 may be designed such that only some of the fluid needs to pass to the inside of the flow modifier 218 while other fluid can exit through the bottom 108 outside of the flow modifier 218. In such a case, the bottom 108 of the frame 102 may be open both inside and outside of the flow modifier 218 (i.e., the solid panels 222 are not necessary).

While shown as a concentric, partially circular prism, the flow modifier 218 may take on other shapes so long as the flow modifier 218 to influence the flow mechanics of the flow modifier 218 (i.e., to alter the flow of the water through the intake screen 100 to meet the designed-for requirements of the intake screen 100). For example, the flow modifier 218 may be generally flat across the bottom 108 of the frame 102. As another example, the flow modifier may be a partially circular prism that is non-concentric with the screen segment 116. In a further example, the flow modifier may be a triangular prism. Thus, the shape of the screen segment 116 does not necessarily dictate the shape of the flow modifier 218.

The number, size, placement, and shape of the holes 220 may also be utilized to influence the flow mechanics of the flow modifier 218. As such, the holes 220 may take on other shapes (e.g., round, slits, etc.). Moreover, the holes 220 may take on any size (including being uniform or varying in size), the holes 220 may be located at any location on the flow modifier, any number of holes 220 may be utilized, and any combination of the above may be utilized to meet the desired flow properties of the particular implementation of the intake screen.

Figure 3:
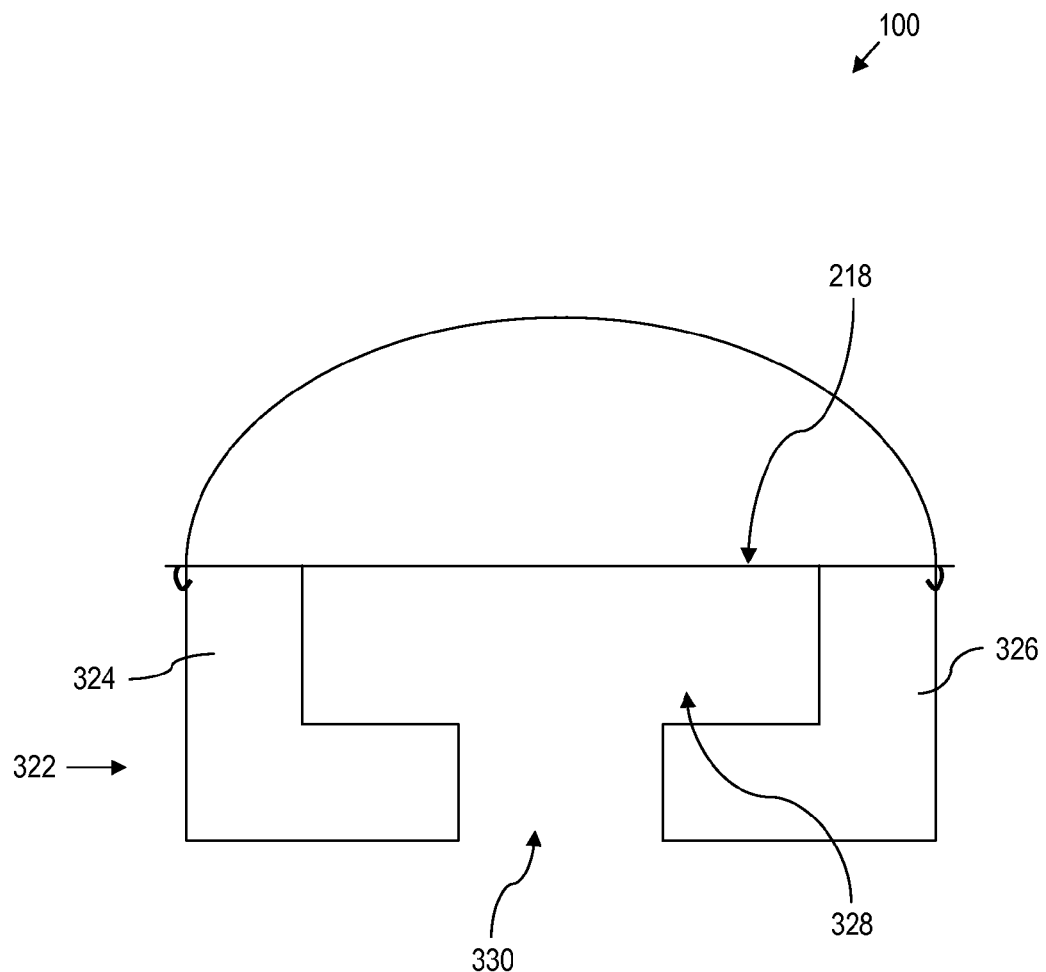
FIG. 3 is a diagram illustrating a half-barrel intake screen with a flat flow modifier mounted on a vaulted base, according to various aspects of the present disclosure.

Turning now to FIG. 3, a cross section view illustrates a half-barrel intake screen 100 mounted on a vaulted base 322. The configuration of the vaulted base 322 defines a hollow portion 328 that leads to a channel 330. More particularly, the intake screen 100 is a partially circular prism in shape and includes a flat flow modifier 218. The vaulted base 322 includes two walls 324, 326 that position the intake screen 100 above the hollow portion 328 and the channel 330 of the base 322.

When a screening system comprising the half-barrel intake screen 100 and the vaulted base 322 is disposed in a water source, water flows through the screen segment 116 to enter the intake screen 100. Then, the water flows through the flow modifier 218 to the hollow portion 328 of the base 322, where the water flows out the channel 330.

As shown in FIG. 3, the intake screen 100 is a partially circular prism in shape and includes a flat flow modifier 218. However, with a vaulted base 322, the intake screen 100 may be of any shape and may include any (or no) flow modifier, as described more fully herein with reference to FIGS. 1 and 2.

Figure 4:
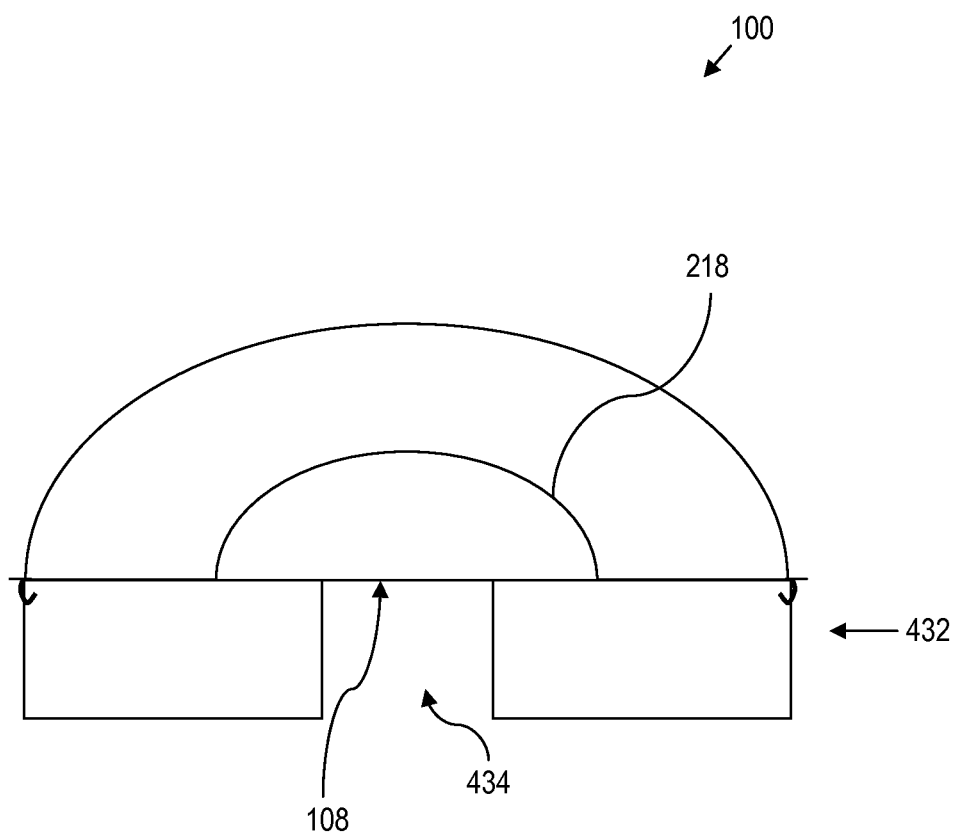
FIG. 4 is a diagram illustrating a half-barrel intake screen mounted on a flat base, according to various aspects of the present disclosure.

FIG. 4 is a cross section of a half-barrel intake screen 100 mounted on a standard base 432 that does not include a hollow portion. The intake screen 100 is a partially circular prism in shape and includes a partially circular prism-shaped flow modifier 218. The standard base 432 positions the intake screen 100 above a channel 434.

When a screening system comprising the half-barrel intake screen 100 and the standard base 432 is disposed in a water source, water flows through the screen segment 116 to enter the intake screen 100. Then, the water flows through the flow modifier 218 to the inside of the flow modifier 218, where the water flows out the bottom 108 of the intake screen 100 to the channel 434 of the base 432.

As shown in FIG. 4, the intake screen 100 is a partially circular prism in shape and includes a partially circular prism flow modifier 218, but the intake screen 100 may be any desired shape with at least one flat side as described herein. For certain flow modifiers 218 to work properly, there must be a hollow portion after (i.e., downstream) the flow modifier 218. In the vaulted base of FIG. 3, the hollow portion is made by the vaulted walls 324, 326. Thus, a flat flow modifier 218 may be used. However, in the standard base, the inside portion of the partially circular prism flow modifier 218 serves as the hollow. Thus, in most instances of a standard base, a flat flow modifier should not be used, unless the channel has enough volume to serve as a hollow portion for the desired flow rate.

Figure 5:
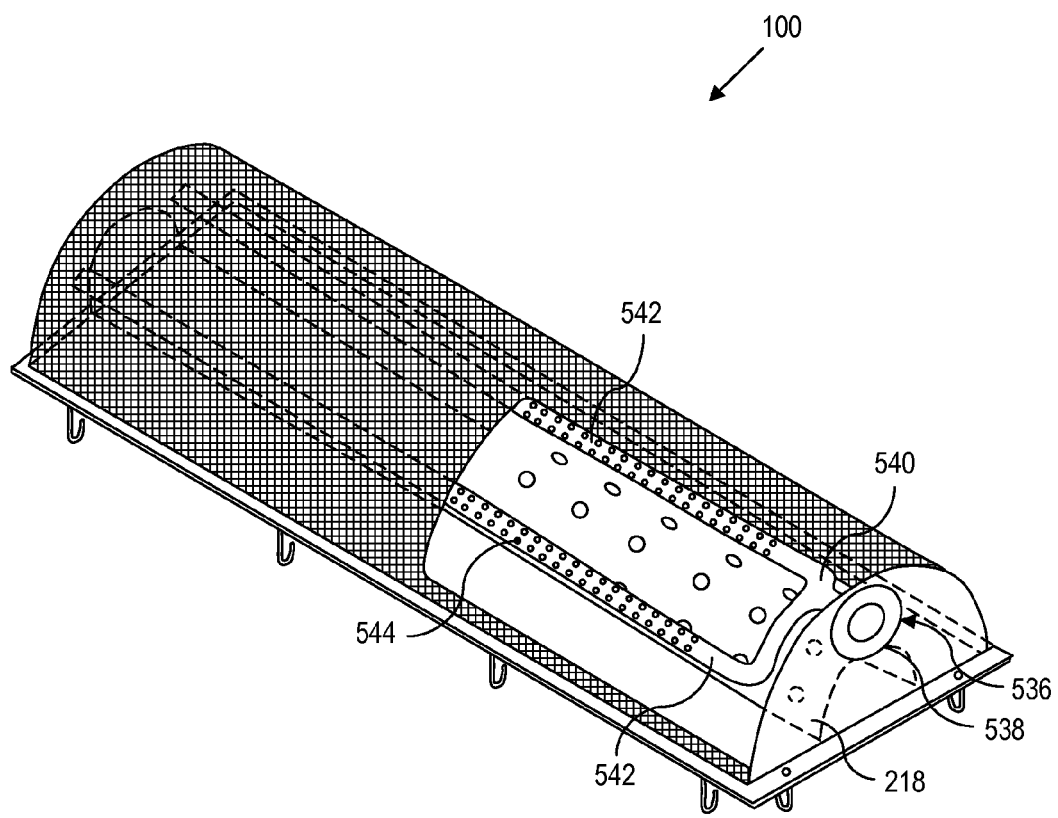
FIG. 5 is a diagram illustrating a half-barrel intake screen with an airburst system, according to various aspects of the present disclosure.

FIG. 5 illustrates a half-barrel intake screen 100 with a flow modifier 218 and an airburst system 536 to remove debris from the intake screen segment 116. The airburst system 536 includes an inlet port 538 in one of the first end 104 or the second end 106 of the frame 102. The inlet port 538 feeds a connection 540. At least one conduit 542 with holes 544 split off of the connection 540 and runs the length of the screen segment 116. For instance, the connection 540 may comprise a T-connection such that two conduits 542 split off the T-connection and run along generally opposite lengths of the intake screen 100 proximate to the screen segment 116. For instance, as illustrated, the conduit 542 of the airburst backwash system 536 is disposed between the screen segment 116 and the flow modifier 218. When an air source (not shown) bursts air into the inlet port 538, the air bursts out of the holes 544 to remove debris that has accumulated on the screen segment 116.

The airbursts can occur on periodic intervals set by any amount of time. Further, the intervals may be irregular. For example, a channel of a base can have a flow sensor to determine the flow rate of water in the channel. When the flow rate drops below a certain threshold, the airburst system can send an airburst, because the low flow rate indicates that debris may be on the screen.

The half-barrel intake screens 100 described herein provide a large amount of surface area compared to the height of the intake screen. Therefore, the half-barrel intake screens described herein are well suited for shallow water applications. Moreover, the half-barrel screens described herein do not require a T-shaped concrete body to which the screen segment attaches. Thus, the intake screen does not require an outlet pipe. In other words, various embodiments of the half-barrel intake screen utilize a continuous screen segment along the entire length of the half-barrel intake screen. Therefore, the added weight and expense of a concrete body is removed from the intake screen, and there is more surface area per length due to no flow-obstructing concrete body. Further, the non-flat flow modifier creates a hollow portion within the screen itself also eliminating a requirement for a hollow concrete body or a vaulted base.

The block diagrams in the Figures illustrate the architecture, functionality, and operation of possible implementations of systems according to various embodiments of the present invention. In this regard, each block in the block diagrams may represent a module.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As noted above, the phrase "partially circular" includes semicircles, quarter circles, three-quarter circles, any amount of a circle, any amount of an ellipse, any amount of an oval, etc.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. An intake screen comprising:
   a frame including:
      a first end;
      a second end; and
      a bottom coupled between the first end and the second end;
   a contiguous screen segment coupled between the first end and the second end of the frame, wherein the contiguous screen segment is coupled to the frame independently of a concrete body having an outlet; and
   a flow modifier disposed on the bottom of the frame and running the length of the frame;
   wherein the bottom includes solid panels that flank the flow modifier.

2. The intake screen of claim 1, wherein the bottom includes an aperture.

3. The intake screen of claim 1, wherein the contiguous screen segment:
   couples directly to the first end, the second end, and the bottom; and
   runs the entire length of the intake screen.

4. The intake screen of claim 1, wherein the first end is a partially circular shape.

5. The intake screen of claim 4, wherein:
   the second end is a partially circular shape; and
   the contiguous screen segment includes a uniform cross section along the length of the intake screen between the first end and the second end.

6. The intake screen of claim 1, wherein the flow modifier is a partially circular prism.

7. The intake screen of claim 1, wherein the flow modifier is flat.

8. The intake screen of claim 1, wherein the flow modifier includes a plurality of holes of a uniform size.

9. The intake screen of claim 1, wherein the flow modifier includes a plurality of holes of a non-uniform size.

10. The intake screen of claim 1, further including an airburst system including:
    a conduit with holes; and
    an inlet that couples between the conduit and an air source, wherein air from the air source removes debris accumulated on the screen segment.

11. The intake screen of claim 10, wherein the conduit of the airburst system is disposed between the screen segment and a flow modifier.

12. The intake screen of claim 11, wherein the airburst system further includes:
    a T-connection; and
    a second conduit;
    wherein:
       the conduit and the second conduit are coupled on opposite ends of the T-connection; and the conduit and the second conduit run parallel to the length of the intake screen.

13. The intake screen of claim 1, wherein bottom of the frame includes a flange.

14. The intake screen of claim 6 further comprising a standard base that does not include a hollow portion that leads to a channel.

15. The intake screen of claim 9 further comprising a vaulted base defining a hollow portion that leads to a channel.

16. The intake screen of claim 12, wherein the T-connection is located inside of the frame.

17. An intake screen comprising:
   a frame including:
      a first end;
      a second end; and
      a bottom coupled between the first end and the second end;
   a contiguous screen segment coupled between the first end and the second end of the frame, wherein the contiguous screen segment is coupled to the frame independently of a concrete body having an outlet; and
   an airburst system comprising:
      a conduit with holes;
      an inlet that couples between the conduit and an air source,
      a T-connection; and
      a second conduit;
   wherein:
      air from the air source removes debris accumulated on the screen segment;
      the conduit and the second conduit are coupled on opposite ends of the T-connection;
      the conduit of the airburst system is disposed between the screen segment and a flow modifier; and
      the conduit and the second conduit run parallel to the length of the intake screen.

18. The intake screen of claim 17, wherein the T-connection is located inside of the frame.

* * * * *

UNITED STATES PATENT AND TRADEMARK OFFICE
CERTIFICATE OF CORRECTION

| | | |
|---|---|---|
| PATENT NO. | : 9,255,372 B2 | Page 1 of 1 |
| APPLICATION NO. | : 13/925976 | |
| DATED | : February 9, 2016 | |
| INVENTOR(S) | : John Whitaker | |

It is certified that error appears in the above-identified patent and that said Letters Patent is hereby corrected as shown below:

In the Claims

Claim 15, column 7, line 8, "intake screen of claim 9" should read --intake screen of claim 7--.

Signed and Sealed this
Tenth Day of May, 2016

Michelle K. Lee
*Director of the United States Patent and Trademark Office*